Dec. 1, 1970  J. M. SELLEN, JR  3,544,888
EMISSIVE E-FIELD METER
Filed Jan. 23, 1967
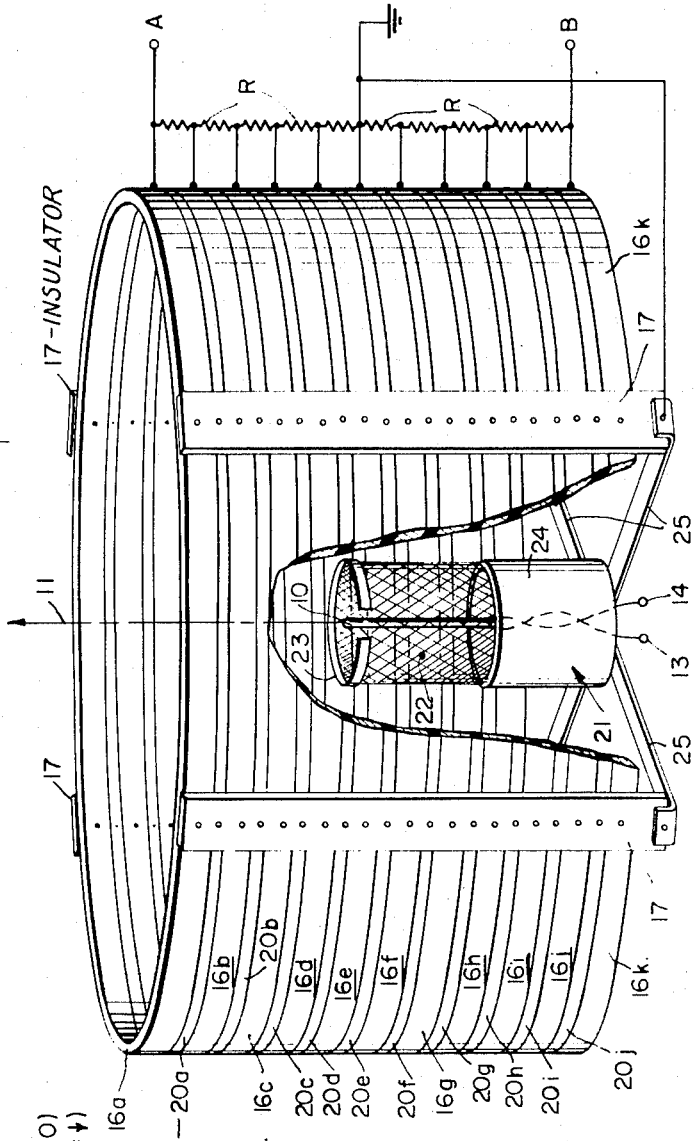
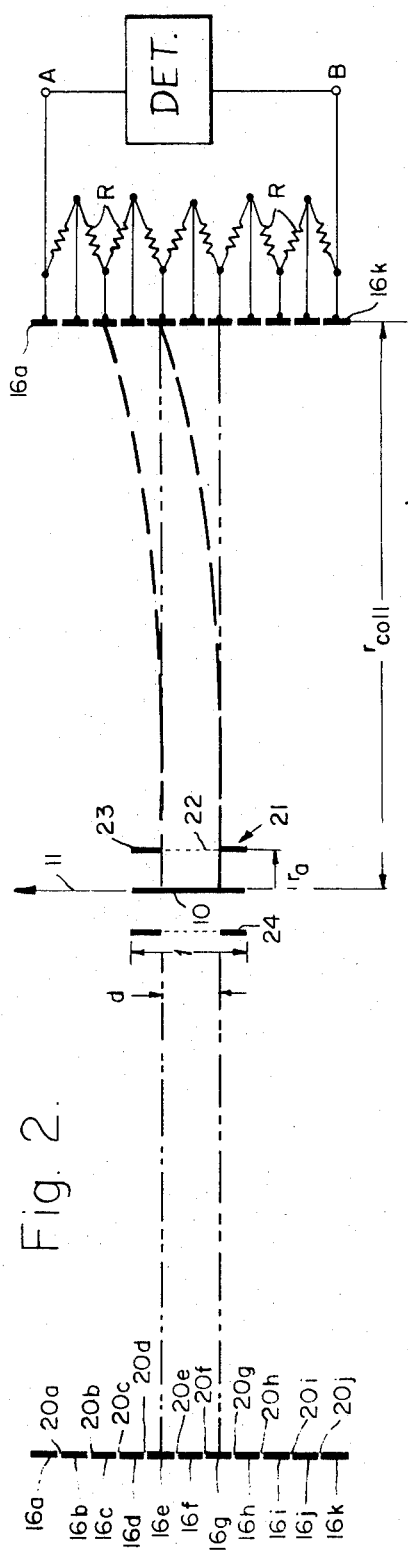
——— Electron Trajectories (E=0)
—·—·— Electron Trajectories (E=↓)
John M. Sellen, Jr
INVENTOR.
BY
*Edward Dugas*
AGENT.

United States Patent Office 3,544,888
Patented Dec. 1, 1970

3,544,888
EMISSIVE E-FIELD METER
John M. Sellen, Jr., Encino, Calif., assignor to TRW Inc., Redondo Beach, Calif., a corporation of Ohio
Filed Jan. 23, 1967, Ser. No. 663,181
Int. Cl. G01r 29/12
U.S. Cl. 324—32                                                        5 Claims

ABSTRACT OF THE DISCLOSURE

The emissive E-field meter has an elongated emissive filament, the elongated dimension of which defines a central axis. The filament generates a beam of electrons radially and perpendicular to the elongated central axis. A cylindrical accelerator anode positioned symmetrically around the filament intercepts the radially generated beam and provides an accelerating potential that effectively collimates the beam. A plurality of collector rings having diameters substantially greater than the diameter of the cylindrical accelerator anode are positioned with their centers axially displaced on the central axis such that the deflections of the electron beam caused by an E-field are detected by sensing which collector rings are struck with the electron beam. Symmetrical placement of the collector rings with respect to the undeflected electron beam allows a differential sensing of the collector rings with respect to the center collector ring.

BACKGROUND OF THE INVENTION

It is not only desirable but often essential to know the electric field strength on the surface of a spacecraft. If the vehicle contains onboard instrumentation for measurement of charged particles in space, both the directionality and the energy of these particles may be influenced by the surface electric field. If the spacecraft is propelled by an electric propulsion unit, this surface electric field and, hence, the potential of the vehicle relative to its surrounding environment, may be severely influenced by the effectiveness of the thrust beam neutralization. Conversely, the measurement of the surface electric field may be utilized as a diagnostic measure of the performance of the thruster's neutralization.

The purpose of an electric field meter is to determine the electric field at a point on the surface of the spacecraft. From this measured field strength and a previous calibration of the spacecraft-E-meter system, the potential of the vehicle relative to its surroundings is inferred. Two basically different E-meters have been employed to determine this surface field. Both meters make use of the effective electric field upon charges. The first and perhaps most familiar type of E-meter is the "field-mill" or "rotating vane" E-meter, disclosed in an article entitled "An Electric Field Meter for Use on Airplanes," by R. C. Wabbel in Rev. Sci. Instr. 19, 31, January 1948. In the instrument of that article, a conducting surface is periodically exposed to and shielded from the electric field, usually by means of a second rotating conductor. The alternating electric field on the static conductor causes the plate to alternately charge and discharge. The resulting induced currents are measured and the electric field on the surface of the spacecraft is determined through a comparatively simple functional relationship of the current to the electrical field strength. A limitation on that particular device is the amount of power necessary to operate the rotating conductor.

A second type of E-meter (of which this invention is one) is the emissive E-meter which employs a current of free electrons. The trajectories of these electrons are affected by the electric field. This results in a functional relationship between the electric field and the distribution of the current to the collecting elements. The electron current may be a carefully collimated beam of monoenergetic electrons from an electron gun or it may be the rather diffuse electron current emitted by a heating surface. In general, the source of the electron is negative with respect to the collecting surface. This E-meter may then be described as a triode with the electric field serving as the function of a control grid. A device of this type is disclosed in U.S. patent application Ser. No. 228,569, entitled "Electric Field Meter" by S. G. Forbes, et al., filed Oct. 5, 1962, now U.S. Pat. 3,283,241, issued on Nov. 1, 1966. In that patent application, a thermionic cathode having a substantially planar electron emitting surface is constructed and arranged so that the emitting surface is exposed to the electrostatic field adjacent the exterior surface of the space vehicle, with the planar emitting surface lying in the same plane as the surrounding vehicle skin. By such an arrangement, the thermionic cathode is adapted to produce an electron space current which varies in amplitude as a function of the strength of the electric fields adjacent the surface of the vehicle. Appropriate circuit means are connected in a manner to be traversed by at least a portion of the electrons constituting the space current so that the circuit means produces an output signal which varies as a function of the strength of the electrical fields of interest. In that case, the cathode emits a fountain-like stream of electrons having trajectories which are dependent on the ambient field strength. As the floating potential of the vehicle becomes less positive relative to its environment, the length of the parabolic trajectory of each electron tends to increase so that the electron current collected by any given anode ring will first increase as the diameter of the electron fountain moves outwardly to that ring and will later decrease as the electron trajectories move outwardly from that particular ring. Thus the electron current collected by the anode rings may be utilized to produce a signal indicative of the ambient field strength. Under normal operating conditions of an emissive E-field meter, the measured currents to the sensing elements may vary by 10% to 20%, with the application of an electric field of 1 volt per centimeter. But for applications wherein the electric field to be measured is in the range of .1 volt per centimeter or even lower, these prior art meters will not do the job. By increasing the size of the meter upward, meter sensitivity can be enhanced, but this enlargement is not without penalties. Increased size of the sensing elements and an increase in the path length for electrons will result in a meter whose performance must be considered in conjunction with the possible noise signals of plasmas, ultra-violet and magnetic fields. It is therefore highly desirable to have an E-meter of increased size so as to provide an increased sensitivity to E-fields and to also have a meter which minimizes the effects of noise levels and any other extraneous signals that are normally encountered with larger size. It has been found that emissive filament type meters having an electron trajectory almost perpendicular to the E-field are the most successful from the standpoint of affecting the trajectory of the electrons. Combining this particular feature with an axial symmetry which allows unwanted background signals to be minimized by cancellation with a differential readout, a highly sensitive and effective instrument is possible.

SUMMARY OF THE INVENTION

The present invention relates to the measurement of electric fields and more particularly to a device for measuring the intensity of electrostatic fields in the vicinity of an isolated object. The desirability of having a highly sensitive E-field meter that minimizes undesirable and extraneous field effect has fostered the device of the present invention.

Accordingly, it is a primary object of the present invention to provide an improved device for measuring the electrostatic field intensities in the vicinity of an isolated object.

It is a further object of the present invention to provide an electrostatic field measuring instrument of substantially increased sensitivity for use in measuring electric fields adjacent to the surface of a space vehicle.

It is a further object of the present invention to provide an electrostatic field measuring device having the capability of minimizing or cancelling various non-E-field effects.

In a preferred form of the present invention, the foregoing objects are achieved by having an elongated emissive filament for generating a radial beam of electron substantially perpendicular to the elongated dimension of the filament, and to the field to be sensed. A plurality of collector rings are positioned symmetrically with respect to the filament with their centers lying substantially along the axis of a cylinder. Sensing means are connected to each of the collector rings to determine which rings are being bombarded by the electron beams. The strength of an E-field may be determined by sensing which rings are being bombarded. In the preferred embodiment, the filament is maintained at a negative potential with respect to the collector rings, and an accelerating anode is symmetrically disposed around the elongated dimension of the filament to collimate the beam electrons substantially perpendicular to the elongated filament dimension.

The foregoing and other objects and features of the present invention will be more apparent and better understood from the following description taken with the accompanying drawings, throughout which like characters indicate like parts and which drawings form a part of this application.

DESCRIPTION OF THE DRAWINGS

FIG. 1 illustrates the preferred embodiment of the present invention in isometric projection form and partially cut away; and FIG. 2 illustrates the embodiment of FIG. 1 in schematic form.

DESCRIPTION OF THE PREFERRED EMBODIMENT

Referring to FIG. 1, an elongated emissive filament 10 is positioned with its elongated dimension coincident with a central axis 11. The filament 10 is excited into emission by an electrical source, not shown for purposes of clarity, which is connected to terminals 13 and 14. The filament material may be tungsten or tungsten and rhenium or any other such material which will generate an electron beam. Because tungsten wire embrittles upon heating, it is necessary to replace the filament once the meter has been calibrated and before the meter is subjected to heavy G-environments such as would be encountered upon the launch of a space vehicle. With the tungsten-rhenium filaments, the need for filament replacement after initial calibration is eliminated. A plurality of conducting collector rings are symmetrically placed around the filament 10 with their centers positioned along the central axis 11. The conductor rings are separated by thin insulating rings 20. The collector rings 16a to 16k and the insulators 20a to 20j are held together with four vertical insulating strips 17. A cylindrical accelerator anode 21 is symmetrically positioned around the filament element 10. The accelerator anode 21 is comprised of a conductive ring-like member 23 and a conductive grid 22, which are supported from a cylindrical conductor 24. The accelerator anode 21 is supported centrally within the collector rings by means of four support arms 25, which are attached to the insulating vertical strips 17. Resistors R interconnect each of the collector rings 16.

The central conductor-ring 16f is connected to a reference potential such as ground or the conductive frame of the spacecraft on which the meter device is mounted.

A pickoff terminal A is connected to the end collector ring 16a and the terminal B is connected to the collector ring 16k. A utilization device or detector "DET." may be connected across terminals A and B with respect to ground, so as to provide a differential output.

Referring now to FIG. 2, the length of the elongated filament element 10 is designated $l$. The thickness of the grid 22 and the electron beam that will be allowed to pass through the grid is designated $d$. The accelerator 21 radius will be designated $r_a$. The radius of the collector rings is designated $r_{coll}$. The gridded portion 22 of the accelerator 21 allows the electrons to enter the region $r_a < r < r_{coll}$. Those electrons that pass through the accelerator grid area are substantially free of any velocity component parallel to the central axis 11. If a velocity component were present, it would produce a spread in electron trajectories at the collecting rings. To produce a completely radial initial motion requires that the outer solid portions of the accelerated grid rings 23 and 24, act as guard electrodes and eliminate those electrons emitted near the ends of the filaments. Sufficient elimination of these outer electrons is assured if $l \simeq d + 2r_a$. Under the influence of an E-field, the beam of electrons is deflected either upwardly or downwardly with respect to the neutral position which is defined by the collector ring 16f. The amount of deflection is directly proportional to the strength of the E-field. The electrons that hit the collector rings pass through the resistances, the serially connected resistors R to ground. The voltages read between terminals A and B with respect to ground will be a differential voltage indicative of the current collector by the collecting rings. A uniform current from the background plasma or solar ultra-violet source does not produce voltage difference between terminals A and B. The effects of magnetic fields are of no concern unless these fields result in severe deflections of the electrons such that the electrons are deflected along a path which does not intercept the collecting rings. The cancellation of magnetic field effects occurs because of the meter's symmetry properties and the differential output measurement techniques.

A typical E-field meter constructed in accordance with the teaching of this disclosure should have the following dimensions in order to achieve a sensitivity of .1 volt per meter. For this calculation, the value of $l$ will be taken as 2 centimeters, and $$d = 1 \text{ centimeter}$$
$$r_a = 0.0 \text{ centimeter} \quad (1)$$

The electron energy after acceleration will be 10 ev.; that is, $V_f$, the voltage of the filament will be equal to $-10$ volts. The collector ring width at the outer edge will be set at 0.5 centimeter and it will be assumed that all resistors R in the measuring ring circuit are equal in their resistance.

Let us now examine the necessary value of $r_{coll}$ so that a substantive deflection occurs for a field of E (applied perpendicular to the plane of the meter). The radius of curvature is given by $$\rho = 2V_f/E \quad (2)$$

and this produces a deflection $$\delta \simeq \frac{r^2_{coll}}{\rho} = \frac{r^2_{coll}(E)}{4V_f} \quad (3)$$

Let us ask this deflection to equal 1 cm. Then $$r^2_{coll} = \frac{4V_f}{E}$$

For $V_f = 10$ volts and $E = 0.1$ volt/cm.; $r^2_{coll} = 400$ and $r_{coll} = 20$ cm. For $V_f = 10$ volts and $E = 0.01$ v./cm.; $r_{coll} = 63.2$ cm. Now, for the resistor network shown in FIG. 2 (each resistor=R) and a total electron current of $i$, the basic unit of potential becomes $iR$. For the smaller meter $V_{AB}=0$
$E=.1$ v./cm.
$V_{AB}=0$
$V_{AB}=2iR$ (polarity depending on sign of E)

For $i=10^{-4}$ amperes and $R=10^3\Omega$, the amplifier input signal appearing at terminals A and B is 0.2 volt for such a comparatively small field. Note that it is not desirable to generate large potentials at the collector rings since these potentials would, in turn, act to influence the electron trajectories. For the meter configuration shown in FIG. 2 (11 collector rings) the maximum electric field would be ±0.225 v./cm. with an output ranging to ±9$iR$. If the output circuitry can measure within 0.1$iR$, then the accuracy of the meter would be 5 millivolts/cm. Say, in general, that the meter would be in the general measuring range of 0.1 v./cm. and with an accuracy of 0.01 v./cm.

If one desires a more sensitive meter (say, 0.01, .001) the meter dimensions must be further enlarged to $r_{coll}=63$ cm. For this large meter, however, the alignment of the filament must be done with great care. Certainly the differential technique of measurement does tend to cancel out misalignment effects (such as a small angle between the filament direction and the axis of the meter). One should not depend upon the differential technique to reduce background effects to an absolute zero, however, and hence the considered feeling that special precaution would be required in the alignment of the larger meters (order of 1 meter in diameter).

There are three points yet to be considered. The first of these is the tolerable magnetic field. In order to avoid substantial deflection of the electrons, the radius of curvature due to $$\vec{v} \times \vec{B}$$

forces must be at least 200 cm. for the (0.1, 0.01) meter configuration. This results that B<.05 gauss is required, while for the larger meter (higher sensitivity), B<.005 gauss is required.

The second of the remaining points to be discussed is that of contact potentials. The electric fields from these potentials are primarily confined to the vicinity of the measuring rings and, as such, cannot materially affect the electron trajectory. The fields are, moreover, oriented in random directions and, as such, should cancel in their net effect on the electron trajectories. The contact potential, however, cannot be expected to leave the electrons totally unaffected and, hence, it is not recommended that electron acceleration energy be reduced below 10 electron volts. Such a lowering of $V_f$ does produce a more sensitive electron beam, but the increased sensitivity to other background effects would result, most likely, in a negligible net again in meter performance.

A final point to be discussed is that concerning non-perpendicular orientation of the electric field to the electron trajectory. Note that a field of 0.1 v./cm. continued over 20 cm. results in a 2-volt potential elevation. This extra acceleration or deceleration upon the electrons can affect their sensitivity to being bent by the perpendicular component of the electric field. This effect should not be large if the $\Delta V$ is small compared to $V_f$. From this and the preceding discussion, $V_f$ should not be reduced below the 10-volt point, it would appear. An extended range meter can be constructed by increasing $V_f$. For example, with $V_f=100$ volts, the meter would range to ±2.25 v./cm. (for $r_{coll}=20$ cm.). Increasing the electron acceleration potential above 100 volts is not recommended because of secondary emission effects. A final point concerns an increased electron beam current. This can be best done by an accel-decel grid system (two grids, the first at a large positive potential, the second at ground potential, the filament remains at $V_f$). Note, however, that space charge forces due to the electron beams themselves can cause the beam to spread and thus reduce the meter sensitivity. From a comparatively simple space charge calculation it can be demonstrated that the electron current should not exceed 100 $\mu$amperes for the 10 ev. acceleration condition.

In the embodiment shown, all of the collector rings are of the same diameter. It is entirely feasible to have the diameters of the collector rings decreasing or increasing from the central rings out to the end rings. Such a device would be more difficult and costly to construct than the device herein illustrated as the preferred embodiment.

What is claimed is:
1. A meter for measuring an electric field in outer space comprising:
  (a) an electron source including an elongated filament for emitting a radially extending electron beam, said filament defining a central axis;
  (b) an accelerating, substantially cylindrical anode positioned about said filament and having a central annular opening for collimating said electron beam;
  (c) a plurality of annular collector rings, each having its center disposed in said central axis, said collector rings having equal diameters and being symmetrically disposed along said central axis with respect to said collimated electron beam;
  (d) means for electrically insulating each of said collector rings from the others;
  (e) a plurality of impedance elements serially connected to each other, each impedance element being connected between adjacent one of said collector rings, the central one of said collector rings being connected to a source of reference potential, whereby the voltage drop across said impedance elements indicates the amount of deflection of said electron beam with respect to said collector rings, the space between said anode and said collector rings being substantially free of conductive matter so as not to perturb the electric field to be measured; and
  (f) means for detecting said voltage drop.
2. The meter defined in claim 1 wherein said impedance elements consist of resistors of equal resistance.
3. The meter defined in claim 1 wherein said means for insulating said collector rings consists of insulating rings disposed between adjacent collector rings.
4. A meter for measuring a steady electric field in outer space comprising:
  (a) a source of electrons including an elongated filament for generating electrons, said filament defining a central axis;
  (b) an accelerator electrode of cylindrical shape surrounding said filament, said anode having a central annular opening;
  (c) a grid disposed in said annular opening for collimating said electrons into a radially extending electron beam;
  (d) a plurality of cylindrical collector elements, each having its origin in said central axis, said collector elements being of equal radius and spaced from each other;
  (e) each collector element having means for electrically insulating it from the others;
  (f) a plurality of resistors serially connected to each other and each being connected between two adjacent collector elements for determining the voltage drop caused by deflection of said electron beam, the space between said accelerator electrode and said collector rings being substantially devoid of conductive material so as not to perturb the electric field to be measured; and
  (g) means for detecting said voltage drop.
5. A meter as defined in claim 4 wherein the central one of said collector elements is connected to a source of reference potential, whereby the voltage drop across said resistors indicates by its potential whether the electron beam is deflected in one direction or the other from the central collector element.

References Cited

UNITED STATES PATENTS

| 1,987,136 | 1/1935 | Sukumlyn | 313—303 X |
| 2,019,770 | 11/1935 | Prinz | 313—303 X |
| 2,090,001 | 8/1937 | Hamacher | 313—303 X |
| 2,197,042 | 4/1940 | Gray | 313—303 X |
| 2,884,550 | 4/1959 | Lafferty | 324—33 X |
| 3,283,241 | 11/1966 | Forbes et al. | 324—32 |

RUDOLPH V. ROLINEC, Primary Examiner

C. F. ROBERTS, Assistant Examiner

U.S. Cl. X.R.

324—33; 313—303